United States Patent

Ishigaki

[15] 3,698,557
[45] Oct. 17, 1972

[54] CLARIFYING FILTER PRESS

[72] Inventor: Eiichi Ishigaki, Sakaide, Japan

[73] Assignee: Ishigaki Kiko Co., Ltd., Chiyuo-cho, Sakaide, Japan

[22] Filed: June 14, 1971

[21] Appl. No.: 152,904

[30] Foreign Application Priority Data

July 11, 1970 Japan ..................45/61227
March 13, 1971 Japan ..................46/13987

[52] U.S. Cl. .............................................210/225
[51] Int. Cl. ............................................B01d 33/00
[58] Field of Search ...........................210/224–231;
100/198, 115

[56] References Cited

UNITED STATES PATENTS 3,647,082  3/1972  Ishigaki ..................210/225

*Primary Examiner*—Reuben Friedman
*Assistant Examiner*—T. A. Granger
*Attorney*—Dawson, Tilten, Fallon & Lungmus

[57] ABSTRACT

A clarifying filter press wherein a plurality of filter frames and filter plates are arranged alternately, said filter frames and filter plates are connected with connecting means in such a manner that the filter frames and filter plates can be separated to give definite intervals therebetween, there are provided to each filter plate a set of endless filter mediums comprising two or more mediums which are trained over rollers so that said mediums cover both supporting beds of each filter plate with integrating to one another and are separated from one another under each filter plate, the filter mediums having been used for filtration are travelled after the filter frames and filter plates are separated, and the filter mediums are washed by washing devices provided on the way of separately travelling of the mediums. This clarifying filter press facilitates a large-scaled filtering treatment of liquid having extremely low content of slurry to a high clarification degree owing to filtration with two or more filter mediums which are integrated to one another.

9 Claims, 12 Drawing Figures

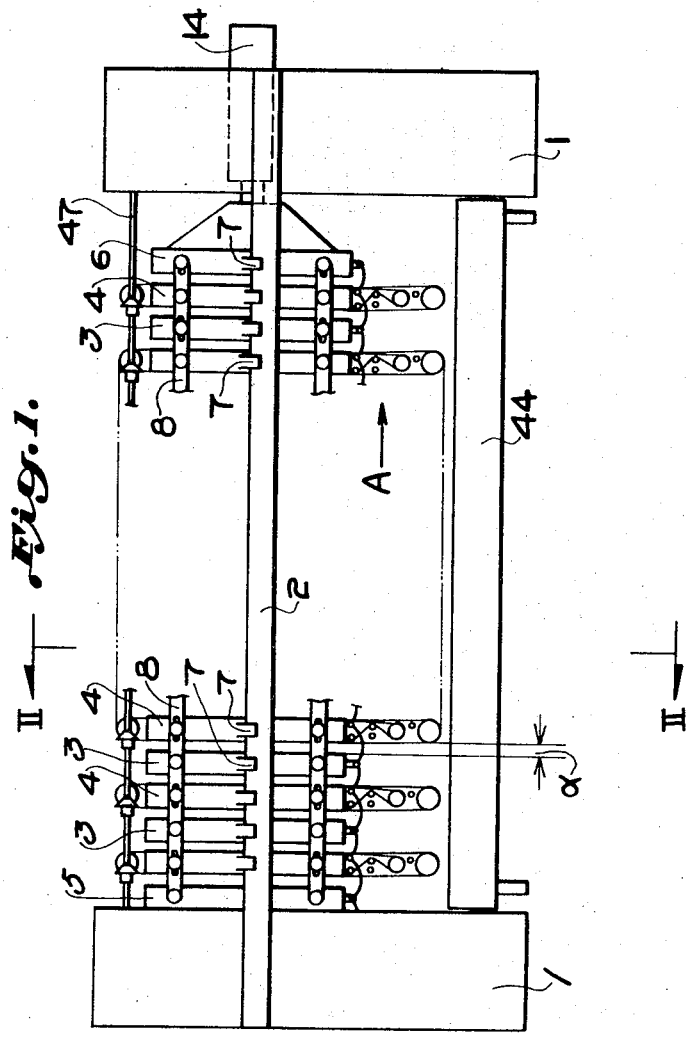

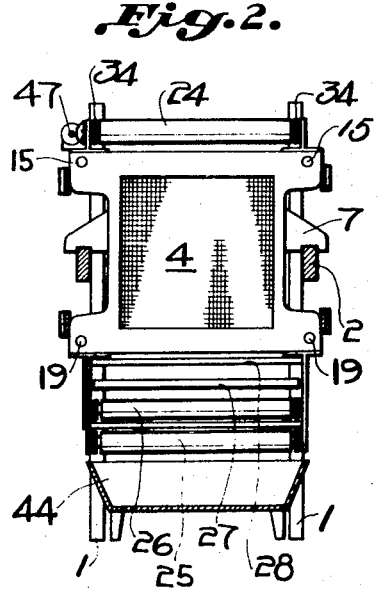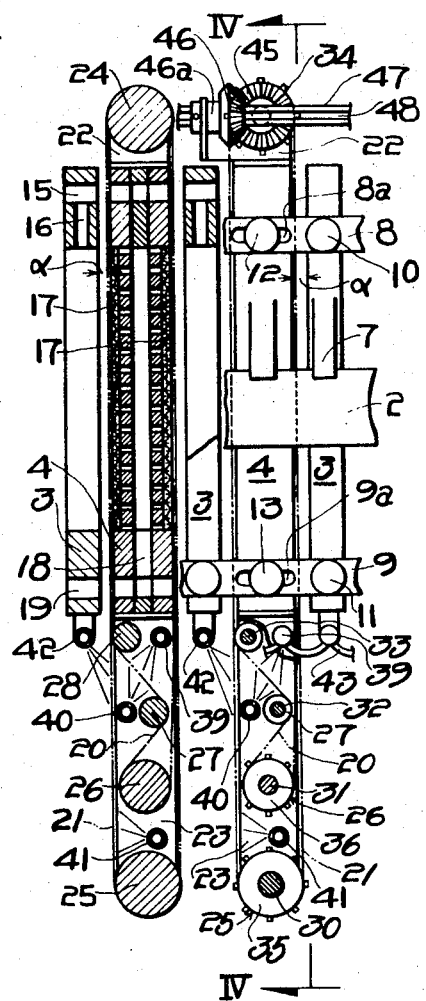

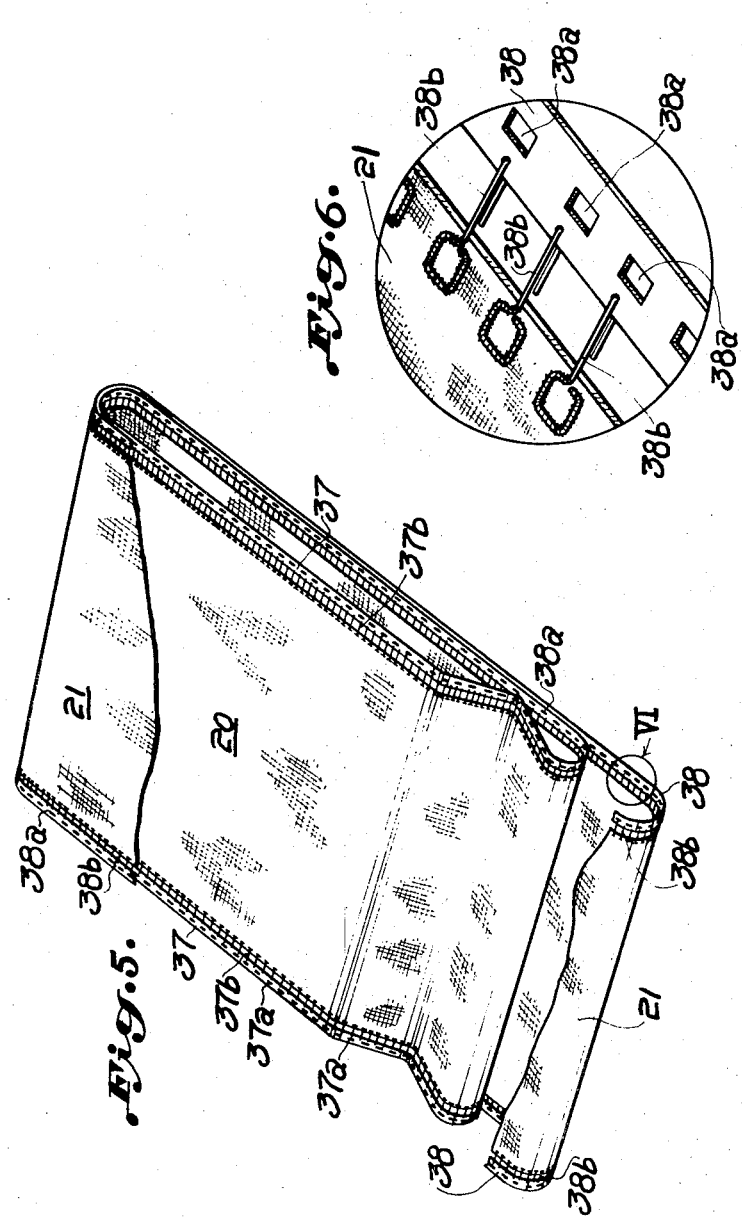

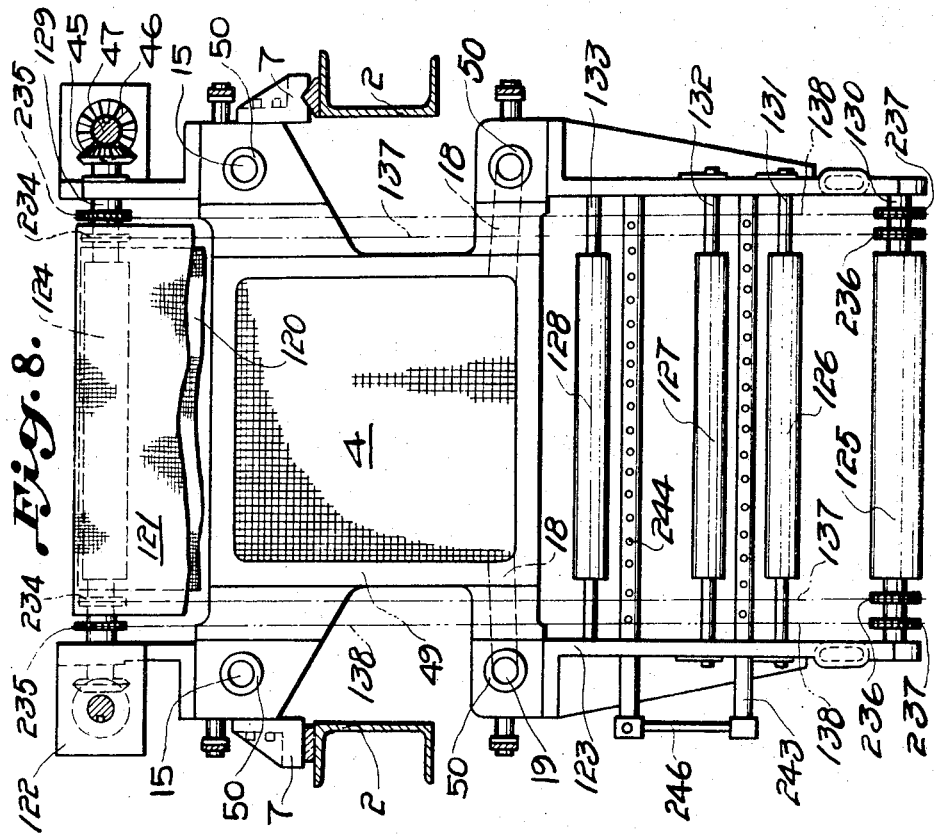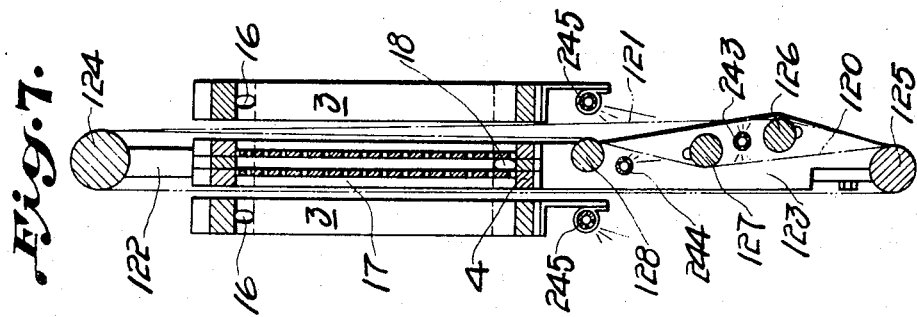

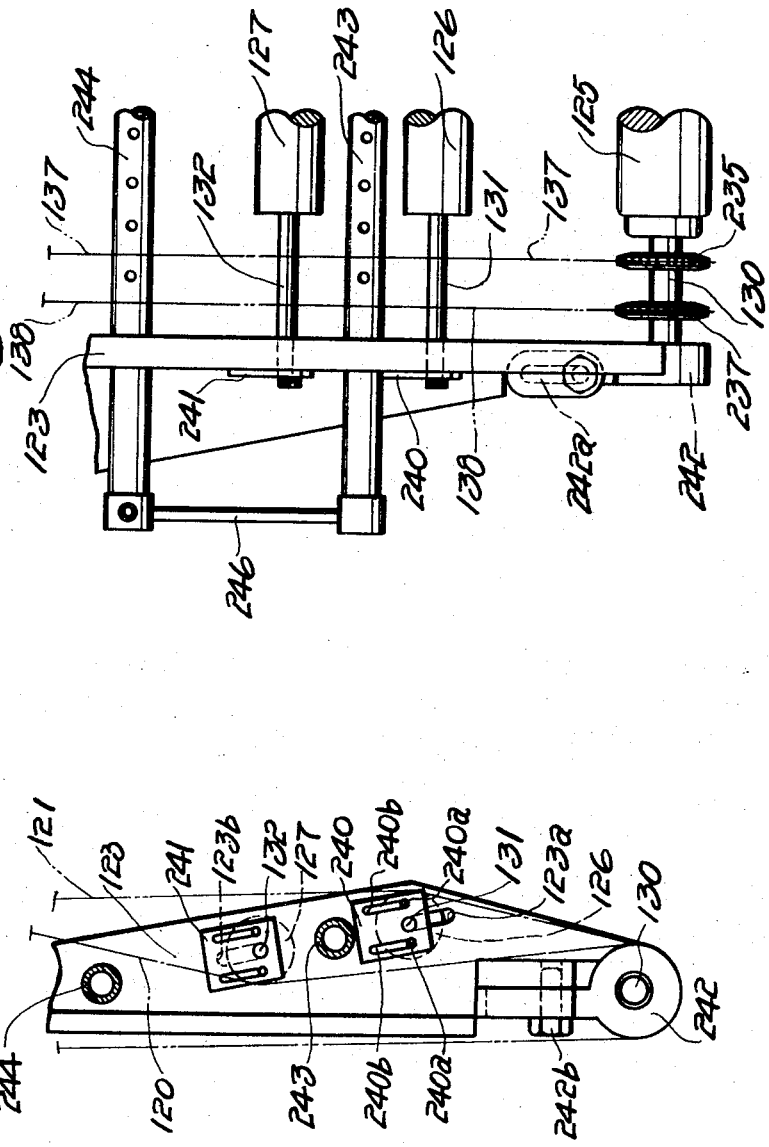

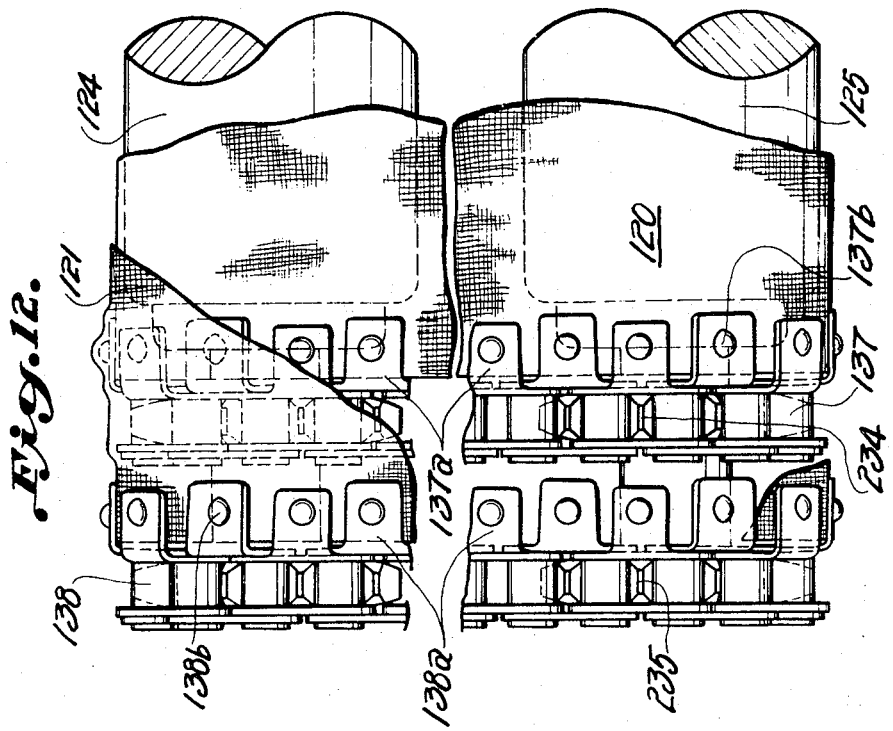
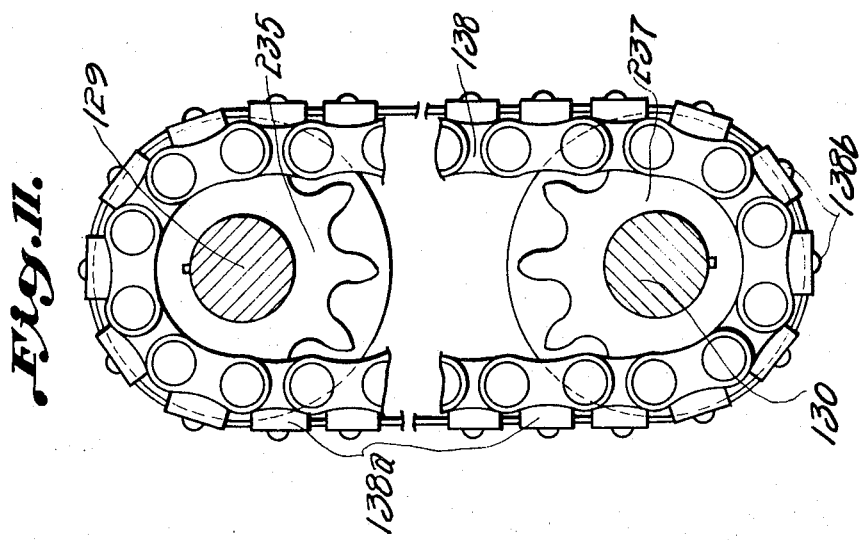

CLARIFYING FILTER PRESS

This invention relates to a novel and improved clarifying filter press, and more particularly to a clarifying filter press which facilitates a large-scaled filtering treatment of liquid to be clarified having an extremely low content of slurry such as sea water, service water, cooling water or the like.

There are known as filtering machines for clarifying such liquid having an extremely low content of slurry pressure filter employing diatomaceous earth or the like as filter-aid and sand filter employing sand as filter medium. The pressure filter employing diatomaceous earth as filter-aid has, however, a defect that operation cost is very high when it is used for clarifying a large amount of sea water or service water. Further, conventional pressure filters never give filtrate having a high clarification degree, for example below 1 p.p.m., when diatomaceous earth is not employed as filter-aid. Accordingly, sand filters have usually been used for treating large amounts of the aforementioned type of liquid to be clarified which liquid is required to be clarified to a high clarification degree. Said sand filters have, however, such defects that a large amount of filtrate is consumed for back-washing of the filter medium, namely sand, a large floor is occupied for installing the filter due to plane filtering bed, and a large period of time and hands are required for exchanging sand having adhered scale per year or per half a year.

Accordingly, it is a primary object of the present invention to provide a novel clarifying filter of the type of the filter press in which the aforementioned defects of conventional filters are fully avoided and which facilitates a large-scaled filtering treatment of liquid to be clarified with a high clarification degree and a low operation cost.

According to the present invention, the above object is attained by constructing a clarifying filter press in such a fashion that a plurality of filter frames and filter plates are arranged alternately between front and rear machine frames, said filter frames and filter plates are connected with connecting means in such a manner that the filter frames and filter plates can be separated to give definite intervals therebetween, required numbers of filter medium supporting rollers are rotatably provided above and below each filter plate, sprocket wheels are fixedly mounted on all or selected shafts of said rollers at both sides thereof, there are provided to each filter plate a set of endless filter mediums comprising two or more mediums which are trained over said rollers and to which are connected at both lengthwise edges pairs of endless guiding means which are engaged with said sprocket wheels, each set of said filter mediums which are integrated together between each adjacent filter frame and filter plate are trained under each filter plate over another supporting rollers so as to separate each of the mediums from one another under the plate, washing devices for cleaning each of thus separated filter mediums are provided respectively, and driving means for travelling each set of said filter mediums are provided to the shafts of one of said supporting rollers.

The present invention will become more readily apparent as the specification is considered in conjunction with the accompanying drawings in which—

FIG. 1 is a side elevational view, partially omitted, of one embodiment of the clarifying filter press according to the present invention showing the state where the filter frames and filter plates are separated;

FIG. 2 is a vertical sectional view taken along line II—II of FIG. 1;

FIG. 3 is an enlarged sectional side view of a part of the clarifying filter press shown in FIG. 1 showing the state where the filter frames and filter plates are separated;

FIG. 5 is a perspective view of a set of filter mediums employed in the clarifying filter press shown in FIG. 1;

FIG. 6 is an enlarged view of the part enclosed with circle VI of FIG. 5;

FIG. 7 is a sectional side view, similar to FIG. 3, of a part of the clarifying filter press according to another embodiment showing the state where the filter frames and filter plates are separated;

FIG. 8 is a vertical sectional view, similar to FIG. 4, of the clarifying filter press shown in FIG. 7;

FIG. 9 is an enlarged side elevational view showing a part existing under a filter plate of the clarifying filter press shown in FIG. 7;

FIG. 10 is an enlarged elevational view showing the part, partially cut away, shown in FIG. 9;

FIG. 11 is an enlarged elevational view, partially cut away, of guiding means for the filter mediums employed in the clarifying filter press shown in FIG. 7;

FIG. 12 is an enlarged side elevational view, partially cut away, of the guiding means shown in FIG. 11.

Figure 4:
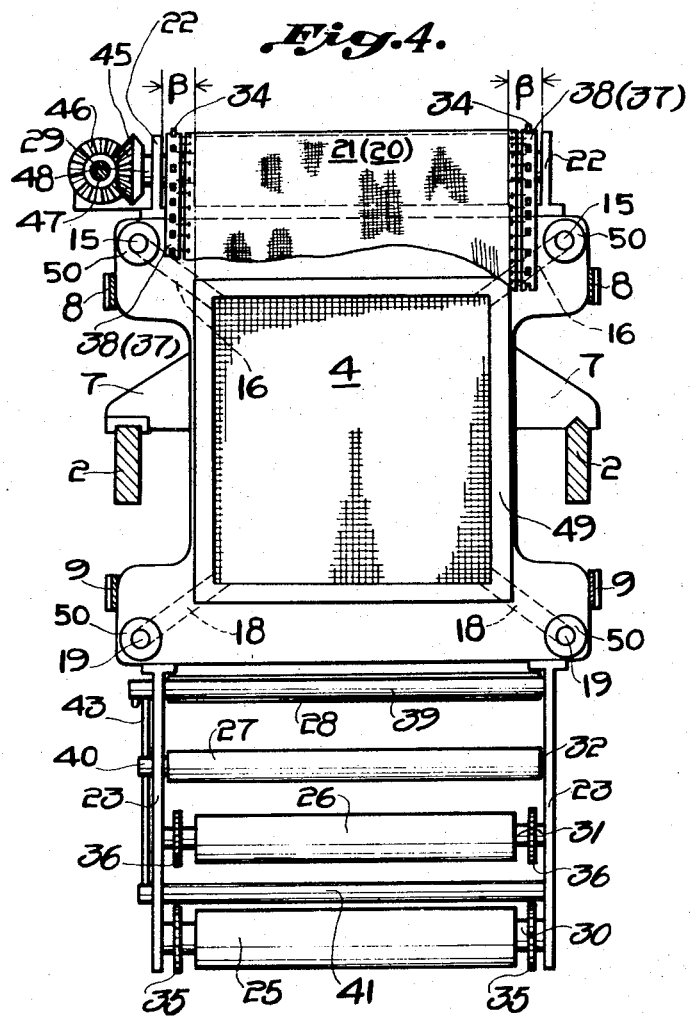
FIG. 4 is a vertical sectional view taken along line IV—IV of FIG. 3.

Referring now to the drawings, in which like numerals designate like parts throughout the several views thereof, there is shown a preferred embodiment of the clarifying filter press according to the present invention in FIGS. 1 through 6. The clarifying filter press includes a pair of guiding rails 2 which are secured to front and rear machine frames 1 at their ends. As is usual, a plurality of filter frames 3 and filter plates 4 are arranged alternately between a fixed head 5, which is fixed to the front frame 1, includes a surface which confronts a filter plate 4 and is similar thereof, and a movable head 6 which is moved along the rails 2. Each of the filter frames 3 and filter plates 4 and the movable head 6 is slidably mounted on the rails by means of arms 7 at both sides and is connected to upper and lower links 8 and 9 having elongated apertures 8a and 9a with equal intervals therebetween so that the filter frames 3 and filter plates 4 may be separated to give definite intervals therebetween. That is, said upper and lower links 8 and 9 are pivotally connected to the fixed head 5 and the filter frames 3 with pins 10 and 11 at the front end and at the center of two adjacent apertures 8a and 9a and are loosely connected to the filter plates 4 with pins 12 and 13 inserted into the apertures 8a and 9a so that a definite small interval is given between each filter frame 3 and filter plate 4 when the movable head 6 is moved toward the direction of arrow A shown in FIG. 1 so as to separate the filter frames 3 and filter plates 4 and said filter frames 3 and filter plates 4 are assembled again when the movable head 6 is moved toward the reverse direction of arrow A shown in FIG. 1. Said movable head 6 is moved by means of an oil pressure motor 14.

Each filter frame 3 is provided with an inlet 16 for liquid to be clarified which inlet is communicated with passages 15 for supplying said liquid. Both surfaces of each filter plate 4 are formed into filter medium supporting beds 17 which are communicated with an outlet 18 for filtrate and said outlet 18 is communicated with passages 19 for recovering filtrate which passages are formed through the assembled filter frames 3 and filter plates 4.

To each filter plate 4 is provided a set of filter mediums comprising two mediums 20 and 21 in the form of endless belts which cover the supporting beds 17 of each filter plate 4 with integrating to each other. Said filter mediums 20 and 21 are different from each other in density.

An upper roller 24 which supports said set of filter mediums 20 and 21 are mounted on the shaft 29 which is rotatably supported with an upper bracket 22 connected to the upper end of each filter plate 4 and lower supporting rollers 25, 26, 27 and 28 are mounted on lower shafts 30, 31, 32 and 33 which are rotatably supported with a lower bracket 23 connected to the lower end of each filter plate 4, respectively. The inner filter medium 20 which is fine in mesh is trained over the rollers 24, 26, 27 and 28 in such a manner that said medium 20 can be travelled along a path nearer to the supporting beds 17 of each filter plate 4 and the outer filter medium 21 which is coarse in mesh is trained over the rollers 24, 25 and 28 in such a manner that said medium 21 can be travelled with integrating to the outer face of the inner medium 20 between each adjacent filter frame 3 and filter plate 4 and apart from the inner medium 20 under each filter plate 4. Pairs of sprocket wheels 34, 35 and 36 are fixedly mounted on the shafts 29, 30 and 31 at both sides thereof, respectively. To both lengthwise edges of the filter mediums 20 and 21 are connected pairs of endless hoop irons 37 and 38 of stainless steel having numerous perforations 37a and 38a with equal intervals therebetween by means of hooks 37b and 38b, respectively. The pairs of endless hoop irons 37 and 38 are engaged with said pairs of sprockets 34 and 35 and 34 and 36 by means of the perforations 37a and 38a so that said filter mediums 20 and 21 always cover the supporting beds 17 of each filter plate 4 properly with integrating to each other and are travelled by means of the sprocket wheels 34. In addition, in place of the endless hoop irons of stainless steel 37 and 38, there can be employed endless bands of another metal, synthetic resin, duck or the like which bands have numerous perforations with equal intervals therebetween engaging the sprocket wheels.

The filter mediums 20 and 21 are guided so as to be separated from each other under each filter plate 4 whereby they are travelled apart from each other under the plate. The supporting rollers 25, 26, 27 and 28 are arranged so as the mediums 20 and 21 to be guided as stated in the above, as shown in FIG. 3.

On the way of the separately travelling of each inner filter medium 20, there are provided washing devices 39 and 40 having nozzles which devices are secured to each lower bracket 23 and clean the medium 20. Similarly, on the way of the separately travelling of each outer filter medium 21, there are provided washing devices 41 and 42 having nozzles which devices are secured to each lower bracket 23 and the lower portion of each filter plate 3. Said washing devices 39, 40, 41 and 42 are communicated to a common flexible pipe 43. Washing water jetting from the nozzles of said washing devices is received with a receptacle 44.

On the common shaft 29 of each upper roller 24 and sprocket wheels 34 is fixedly mounted a bevel gear 45 which is engaged with a bevel gear 46. The latter gear 46 is provided with a key (not shown in the drawings) which engages a spline groove 48 of a driving shaft 47 bridged between the front and rear machine frames 1 and the boss 46a of said latter gear 46 is rotatably supported with the upper bracket 22, whereby the bevel gear 46 is slidably but not rotatably mounted on said driving shaft 47.

The driving shaft 47 is operatively connected to a driving source (not shown in the drawings) and drives each pair of endless filter mediums 20 and 21 with the endless hoop irons 37 and 38 to travel the mediums 20 and 21 in a same direction with a same travelling speed after the mediums 20 and 21 and irons 37 and 38 have been integrated to each other on the roller 24 and sprocket wheels 34.

Further, as shown in FIG. 4, packings 49 and 50 are sticked to the surface of each filter frame 3 at the place where each of filter mediums 20 and 21 are in contact with the frame and at the places near the passages 15 and 19 so that each filter frame 3 is somewhat increased in thickness at said places than at the other places of the frame and the aforestated endless hoop irons 37 and 38 and hooks 37b and 38b are travelled through the clearances with width $\beta$ formed between the surface of each filterplate 4 and the places of each filter frame 3 where the thickness of the frame is not increased.

When filtration is intended, liquid to be clarified is supplied under a pressure into the filter press with the filter frames 3 and filter plates 4 through the passages 15 and filtrate having been filtered through the integrated filter mediums 20 and 21 is withdrawn into the recovering passages 19.

When filtering rate becomes reduced due to the choking of the filter mediums 20 and 21 with sludge having adhered on the mediums, the supply of liquid to be filtered is stopped and then the filter frames 3 and filter plates 4 are separated to give said small interval $\alpha$ between each adjacent filter frame 3 and filter plate. Then, the driving shaft 47 is rotated so as to travel each pair of the filter mediums 20 and 21 round each filter plate 4 and compressed washing water is jetted from the washing devices 39, 40, 41 and 42 so that each of the travelling mediums 20 and 21 is cleaned at the same time. After the mediums 20 and 21 have thus been cleaned, the filter frames 3 and the filter plates 4 are assembled again for the next filtering operation.

Referring to FIGS. 7 to 12, there is shown another embodiment of the clarifying filter press according to the present invention. In this improved embodiment, filter mediums 120 and 121 in the form of endless belts which are provided to each filter plate 4 as a set are made equal in length. Said filter mediums 120 and 121 are integrated to each other and are different from each other in density, as is the case in the aforementioned embodiment shown in FIGS. 1 through 6.

An upper roller 124 which supports said set of filter mediums 120 and 121 are mounted on a shaft 129 which is rotatably supported with an upper bracket 122 connected to the upper end of each filter plate 4 and lower supporting rollers 125, 126, 127 and 128 are mounted on lower shafts 130, 131, 132 and 133 which are rotatably supported with a lower bracket 123 connected to the lower end of each filter plate 4, respectively. The inner filter medium 120 which is fine in mesh is trained over the rollers 124, 125, 127 and 128 in such a manner that said medium 120 can be travelled along a path nearer to the supporting beds 17 of each filter plate 4 and the outer filter medium 121 which is coarse in mesh is trained over the rollers 124, 125, 126 and 128 in such a manner that said medium 121 can be travelled with integrating to the outer face of the inner medium 120 between each adjacent filter frame 3 and filter plate 4 and apart from the inner medium 120 under each filter plate 4 at the back side thereof. Pairs of sprocket wheels 234 and 235 and sprocket wheels 236 and 237 are fixedly mounted on the shafts 129 and shafts 130 at both sides thereof, respectively. To both lengthwise edges of the filter mediums 120 and 121 are connected pairs of endless chains 137 and 138 having arms 137a and 138a laterally projected therefrom by means of rivets or eyelets 137b and 138b respectively, as shown in FIGS. 11 and 12. The pairs of endless chains 137 and 138 are engaged with said pairs of sprocket wheels 234 and 236 and sprocket wheels 235 and 237 so that said filter mediums 120 and 121 always cover the supporting beds 17 of each filter plate 4 properly with integrating to each other and are travelled by means of the sprocket wheels 234 and 235.

The filter mediums 120 and 121 are guided so as to be separated from each other under filter plate 4 at the backside by means of the roller 126 whereby they are travelled apart from each other under the plate. That is, the supporting roller 126 is supported by backwardly projected portion of the lower bracket 123, is positioned between the filter mediums 120 and 121, and is rotatably engaged to the inner face of the outer medium 121. Said outer medium 121 is always forced by the roller 126 into such direction that said medium 121 becomes separated from the inner medium 120 or the mediums 120 and 121 are separated from each other. For the purpose of adjusting or regulating the force given by the roller 126, the shaft 131 of said roller 126 is received at both ends by inclined elongated apertures 123a provided to the bracket 123 and by receiving bores of a pair of plate members 240 which are secured to the bracket 123, by means of bolts 240a inserted into elongated apertures 240b of said plate members, as shown in FIG. 9, so that the shaft 131 of the roller 126 may be displaced upwardly and downwardly and also forwardly and backwardly by displacing the plate members 240. Further, in the filter press shown in FIGS. 7 to 12, the shaft 132 of the filter medium supporting roller 127 rotatably engaged to the outer face of the inner medium 120 is similarly received at both ends by elongated apertures 123b of the bracket 123 and receiving bores of a pair of similarly constructed plate members 241, as shown in FIG. 9, so that tension given to the inner filter medium 120 may also be adjusted or regulated by displacing the plate members 141. Furthermore, in the filter press shown in FIGS. 7 to 12, the lowermost supporting roller 125 is formed into a taking-up roller. That is, bearing members 242 of the shaft 130 of said roller 125 are secured to the lower end of the bracket 123 by bolts 242b inserted into elongated apertures 242a of said members 242, as shown in FIGS. 9 and 10, whereby tension given to both filter mediums 120 and 121 may be controlled or regulated by displacing the bearing members 242 upwardly and downwardly.

A washing tube or device 243 is provided between the separated filter mediums 120 and 121 by securing to the bracket 123. The washing device 243 is provided with a number of nozzles from which water for washing the outer face of the inner filter medium 120 is jetted and a number of nozzles from which water for washing the inner face of the outer filter medium 121 is jetted. Further, to the bracket 123 is secured a washing tube or device 244 having numerous nozzles for jetting water for washing the inner face of the inner filter medium 120 and to the lower end of each filter frame 3 is secured a washing tube or device 245 having numerous nozzles for jetting water for washing the outer face of the outer filter medium 121. These washing tubes 243, 244 and 245 are communicated with one another by means of flexible pipes 246 and the like. Washing water jetted from the nozzles of said washing devices 243, 244 and 245 is received with a receptacle (not shown in the drawings) which is provided under the filter press.

The other parts of the clarifying filter press shown in FIGS. 7 to 12 are constructed in similar fashions with the one shown in FIGS. 1 to 6 and detailed before, and are designated by like numerals shown in FIGS. 1 through 6.

The important feature of the clarifying filter press shown in FIGS. 7 through 12 consists in the fact that all of the filter mediums in each set are made equal in length. If the filter mediums in one set are made different in length from one another, as is the case in the embodiment shown in FIGS. 1 through 6, outer and inner mediums are integrated at different portion from the integrated of filtering process of prior stage when each of the filter mediums has been travelled for washing the same. Thus, different portion of each filter medium is used for filtration in each filtering cycle and also the joint of each endless filter medium is positioned at different position of each filter plate in each filtering cycle, whereby there is a trouble that said joint where sealing and filtration are impossible is brought on the filter medium supporting bed. When all of the filter medium in each set are made equal in length according to the present embodiment, outer and inner filter mediums are always integrated at same position even after the mediums are travelled for washing. Accordingly, only by constructing the filter press in such a fashion that the filter mediums are always travelled by just one cycle in each washing cycle, same portion of each filter medium is always used for filtration and the joint of each endless filter medium is always positioned in each filtering cycle at a same position, for example on one of the supporting rollers, where the aforementioned trouble is never brought.

Although each set of the filter mediums provided to each filter frame comprises two endless filter mediums in the two embodiments shown in the drawings and having been detailed hereinbefore, said set of filter mediums may comprise more than three such endless filter mediums, as can be understood now.

The particular advantage of the clarifying filter press according to the present invention consists in the fact that filtrate with an extremely high clarification degree can be obtained owing to filtration more than twice with filter mediums having different densities from one another. Thus, in combination with the characteristic feature of the filter press that large-scaled filtering treatment can be made, the clarifying filter press according to the present invention facilitates the large-scaled filtration of liquid to be clarified, which liquid has an extremely low content of slurry, to a high clarification degree. Indeed, such a liquid can easily be clarified to a clarification degree below 1 p.p.m. only by using filter mediums employed in the clarifying filter press according to the present invention.

Further, in the clarifying filter press according to the present invention, each set of filter mediums are provided to each filter plate and are travelled at the same time so that required period of time for cleaning the mediums with washing devices is very short notwithstanding a filter medium travelling-type filter press. In addition, owing to the above construction, only damaged filter mediums which are short in length may be exchanged when such damages are resulted in the mediums, that is really economical and time-saving.

Furthermore, in the clarifying filter press according to the present invention, each filter medium is guided through the aforestated type of endless guiding means and sprocket wheels engaged therewith so that said medium is travelled along a predetermined path without deviation.

Having now described the invention and having exemplified the manner in which it can be carried into practice, it is apparent to those skilled in the art that innumerable variations, applications, modifications and extensions of the basic principles involved may be made without departing from the spirit of the present invention. The invention is, therefore, to be limited only by the scope of the appended claims.

I claim:

1. A clarifying filter press wherein a plurality of filter frames and filter plates are arranged alternately between front and rear machine frames, said filter frames and filter plates are connected with connecting means in such a manner that the filter frames and filter plates can be separated to give definite intervals therebetween, required numbers of filter medium supporting rollers are rotatably provided above and below each filter plate, sprocket wheels are fixedly mounted on all or selected shafts of said rollers at both sides thereof, there are provided to each filter plate a set of endless filter mediums comprising at least two mediums which are trained over said rollers and to which are connected at both lengthwise edges pairs of endless guiding means which are engaged with said sprocket wheels, each set of said filter mediums which are integrated together between each adjacent filter frame and filter plate are trained under each filter plate over another supporting rollers so as to separate each of the mediums from one another under the plate, washing devices for cleaning each of thus separated filter medium are provided respectively, and driving means for travelling each set of said filter mediums are provided to the shafts of one of said supporting rollers.

2. The clarifying filter press as claimed in claim 1 wherein all of the filter mediums in each set are made equal in length.

3. The clarifying filter press as claimed in claim 1 wherein said filter mediums in each set thereof are different from one another in density and the filter mediums being finer in mesh are positioned at positions nearer to the supporting bed of each filter plate than the filter mediums being coarser in mesh.

4. The clarifying filter press as claimed in claim 1 wherein each of said endless guiding means is composed of an endless band of metal, synthetic resin, duck or the like having numerous perforations along lengthwise direction thereof which perforations are engaged with said sprocket wheels.

5. The clarifying filter press as claimed in claim 1 wherein each of said endless guiding means is composed of an endless chain which are engaged with said sprocket wheels.

6. The clarifying filter press as claimed in claim 1 wherein said driving means for travelling the filter mediums comprise a driving shaft which is bridged between the front and rear machine frames and is driven by a driving source, bevel gears which are slidably but not rotatably mounted on said driving shaft, and another bevel gears which are fixedly mounted on the shafts of said upper rollers and are engaged with former bevel gears respectively.

7. The clarifying filter press as claimed in claim 1 wherein said filter frames and filter plates are arranged alternately between a fixed head and a movable head, the filter frames, the filter plates and said movable head are slidably mounted on a pair of guiding rails in such a manner that said frames, plates and head can be slid along said rails, said connecting means comprise upper and lower links which have elongated apertures with equal intervals therebetween and are pivotally connected to said fixed head at one ends respectively, the filter frames are pivotally connected to said links with equal intervals therebetween, and the filter plates and the movable head are connected to said links with pins which are fixedly provided to said frames and movable head and are inserted into said apertures of the links.

8. The clarifying filter press as claimed in claim 1 wherein packings are added to the surface of each filter frame at the place where each set of said filter mediums are in contact with the frame and at the places near passages for liquid to be filtered and for filtrate so that each filter frame is somewhat increased in thickness at said places than at the other places of the frame and said endless guiding means and means for connecting said guiding means to the filter mediums are travelled through the clearances formed between the surface of each filter plate and the places of each filter frame where the thickness of the frame is not increased.

9. The clarifying filter press as claimed in claim 1 wherein at least one of the shafts of said supporting rollers is supported in such a manner that said shaft can be displaced whereby the tension given to at least one of the filter mediums by said roller may be regulated or controlled.

* * * * *